(12) United States Patent
Gao et al.

(10) Patent No.: US 10,831,401 B2
(45) Date of Patent: Nov. 10, 2020

(54) METHOD, DEVICE AND COMPUTER PROGRAM PRODUCT FOR WRITING DATA

(71) Applicant: EMC IP Holding Company LLC, Hopkinton, MA (US)

(72) Inventors: Hongpo Gao, Beijing (CN); Jian Gao, Beijing (CN); Jianbin Kang, Beijing (CN); Geng Han, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 15 days.

(21) Appl. No.: 16/250,140

(22) Filed: Jan. 17, 2019

(65) Prior Publication Data
US 2019/0220221 A1 Jul. 18, 2019

(30) Foreign Application Priority Data
Jan. 18, 2018 (CN) .......................... 2018 1 0049266

(51) Int. Cl.
*G06F 3/06* (2006.01)
(52) U.S. Cl.
CPC .......... *G06F 3/0655* (2013.01); *G06F 3/0604* (2013.01); *G06F 3/065* (2013.01); *G06F 3/0689* (2013.01)
(58) Field of Classification Search
CPC ...... G06F 3/0604; G06F 3/0619; G06F 3/065; G06F 3/0655; G06F 3/0683; G06F 3/0689; G06F 11/2053; G06F 11/2094
USPC .......................... 711/154, 162; 714/6.22, 6.3
See application file for complete search history.

(56) References Cited

U.S. PATENT DOCUMENTS

| 9,928,246 | B1 | 3/2018 | Xu et al. |
| 10,152,387 | B1 | 12/2018 | Chakraborty et al. |
| 10,176,183 | B1* | 1/2019 | Shim ..................... G06F 3/0617 |
| 10,210,052 | B1 | 2/2019 | Kumar et al. |
| 10,235,066 | B1 | 3/2019 | Chen et al. |
| 10,310,949 | B1 | 6/2019 | Chakraborty et al. |
| 2007/0185938 | A1* | 8/2007 | Prahlad ............... G06F 16/2365 |
| 2012/0144110 | A1* | 6/2012 | Smith .................. G06F 3/0607 |
| | | | 711/114 |
| 2014/0201434 | A1* | 7/2014 | Hassanpur .............. G06F 12/16 |
| | | | 711/104 |

* cited by examiner

*Primary Examiner* — Gary J Portka
(74) *Attorney, Agent, or Firm* — BainwoodHuang (57) ABSTRACT

Techniques involve receiving a write request for a first storage block in a source storage area during copying first data from the source storage area to a target storage area. The techniques further involve writing second data associated with the write request into a second storage block of the target storage area, wherein the second storage block corresponds to the first storage block. The techniques further involve updating an indicator associated with the first storage block, wherein the indicator indicates that the second data is written by the write request during the copying. Such techniques enable the data to be written into the target storage area directly without being written into the source storage area by setting an indicator indicating whether a storage block receives a write request during data copying. Accordingly, such techniques can improve write performance during data copying, and extend source storage area lifetime.

23 Claims, 9 Drawing Sheets

FIG. 9

METHOD, DEVICE AND COMPUTER PROGRAM PRODUCT FOR WRITING DATA

FIELD

Embodiments of the present disclosure generally relate to the field of data storage, and more specifically, to method, device and computer program product for writing data.

BACKGROUND

Data copying refers to copying data from one storage area to another storage area and is usually used for data transfer or backup. Generally speaking, a data copy operation has a basic unit of operation, which is also known as copy granularity. For example, a storage area is divided into a plurality of storage blocks of the same size, and the size of each storage block can be considered as granularity of data copying. During data copying, data in one storage block, such as one data block, is copied for each copy operation.

Redundant Array of Independent Disks (RAID) is a data backup technology, which can combine a plurality of independent physical disks into a disk array (i.e., logic disk) in different manners, so as to provide higher storage performance and higher reliability than a single disk. In order to recovery data when a certain disk in the RAID fails, the RAID is often provided with a parity information block (e.g., RAID 5) or a plurality of parity information blocks (e.g., RAID 6).

SUMMARY

Embodiments of the present disclosure provide method, device and computer program product for writing data.

In a first aspect of the present disclosure, a method for writing data is provided. The method includes: receiving a write request for a first storage block in a source storage area during copying first data from the source storage area to a target storage area; writing second data associated with the write request into a second storage block of the target storage area, the second storage block corresponding to the first storage block; and updating an indicator associated with the first storage block, wherein the indicator indicates that the second data is written by the write request during the copying.

In another aspect of the present disclosure, a device for writing data is provided. The device includes a processing unit; and a memory coupled to the processing unit and storing instructions. The instructions, when executed by the processing unit, perform actions of: receiving a write request for a first storage block in a source storage area during copying first data from the source storage area to a target storage area; writing second data associated with the write request into a second storage block of the target storage area, wherein the second storage block corresponds to the first storage block; and updating an indicator associated with the first storage block, wherein the indicator indicates that the second data is written by the write request during the copying.

In a further aspect of the present disclosure, a computer program product is provided. The computer program product is tangibly stored on a non-transient computer-readable medium and includes computer-executable instructions, the computer-executable instructions, when executed, causing a computer to perform the method or procedure according to the embodiments of the present disclosure.

The Summary is provided merely to introduce a selection of concepts in a simplified form that are further described below in the Detailed Description. This Summary is not intended to identify key features or essential features of the present disclosure, nor is it intended to be used to limit the scope of the various embodiments of the present disclosure.

BRIEF DESCRIPTION OF THE DRAWINGS

The above and other objectives, features, and advantages of the present disclosure will become more apparent through the following more detailed description of the example embodiments of the present disclosure, taken in conjunction with the accompanying drawings, in which the same reference character usually refers to the same element in the example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments of the present disclosure will be described in more details with reference to the drawings.

Although the drawings illustrate some specific embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants mean open-ended terms i.e. "includes, but is not limited to." The term "or" means "and/or" unless specifically stated otherwise. The term "based on" means "based at least in part on." The terms "one example embodiment" and "one embodiment" mean "at least one example embodiment." The term "another embodiment" means "at least another embodiment." The terms "first", "second" and so on can refer to different or same objects unless clearly indicated different otherwise. The term "storage area" represents a non-volatile memory that stores data permanently, such as a disk. Examples of disks include but are not limited to, Hard Disk Drive (HDD), optical drive and Solid-State Disk (SSD), and the like.

Traditionally, checkpoints of the copying (i.e., progress of the copy operation) are usually left out of consideration when receiving a write request for the data during the data copying. Therefore, a traditional method will write data into both source storage area and target storage area. If a read request reads data in storage blocks prior to the checkpoints, it can read from the source storage area or the target storage area; however, if the read request reads data in storage blocks after the checkpoints, it can only read from the source storage area. However, as the traditional method needs to write data into both source storage area and target storage area, it is required to write double data, which costs more time and impacts write performance of the storage system accordingly. Besides, since the data also needs to be written into the source storage area, excessive writing will reduce the lifetime of the source storage area.

Embodiments of the present disclosure provide a solution for writing data during copying. According to embodiments of the present disclosure, by setting an indicator indicating whether a storage block receives a write request during data copying, data to be written can be written into the target storage area directly without being written into the source storage area. Hence, embodiments of the present disclosure not only can enhance write performance during data copy, but also can extend the lifetime of the source storage area.

Moreover, embodiments of the present disclosure can effectively perform data writing during copying by comparing storage block position of data to be written and checkpoints. Meanwhile, embodiments of the present disclosure provide a failure handling method during copying, which can process failures of the processor and the storage area, thereby ensuring accuracy and integrity of data. Besides, as the mapped RAID has a greater demand for data copying, the method of the embodiments of the present disclosure is suitable for scenarios of disk replacement and disk addition in the mapped RAID, which can improve performance of the mapped RAID.

Basic principles and several example implementations of the present disclosure will be explained with reference to FIGS. 1 to 9. It should be understood that these example embodiments are presented only to enable those skilled in the art to better understand and further implement embodiments of the present disclosure, rather than limiting the scope of the present disclosure in any manners.

Figure 1:
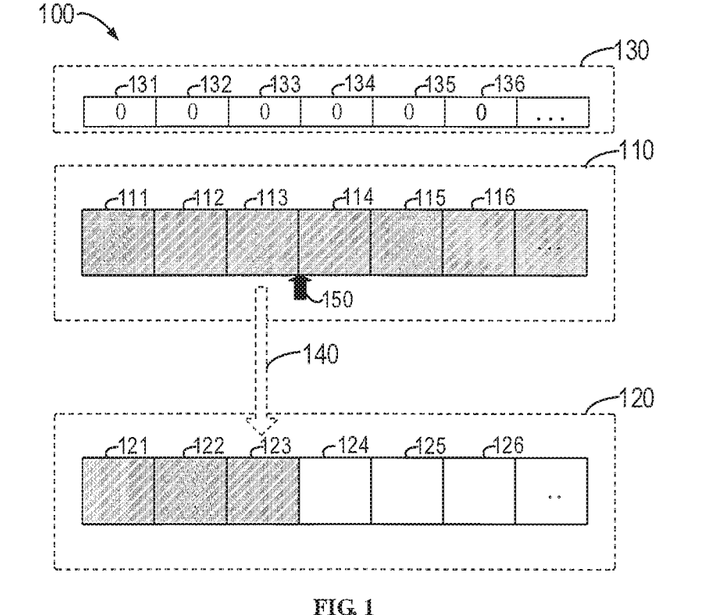
FIG. 1 illustrates a schematic diagram of an example environment for writing data during copying, according to embodiments of the present disclosure.

FIG. 1 illustrates a schematic diagram of an example environment 100 for writing data during copying according to embodiments of the present disclosure. As shown in FIG. 1, the environment 100 includes a source storage area 110 and a target storage area 120, both of which can be various persistent data storage apparatuses, such as Hard Disk Drive (HDD), Solid-State Disk (SSD) and the like. The source storage area 110 and the target storage area 120 are usually divided into storage blocks of multiple sizes, and the size of each storage block can be same, so as to constitute the basic copy unit of the storage area, i.e., granularity. For each copy operation, it can complete data copying in one storage block. As shown in FIG. 1, the source storage area 110 includes storage blocks 111, 112, 113, 114, 115, 116 and the like, and the target storage area 120 includes storage blocks 121, 122, 123, 124, 125, 126 and so on.

As shown in FIG. 1, the environment 100 also includes an indicator set 130 consisting of a plurality of indicators 131, 132, 133, 134, 135, 136 and the like. Each indicator indicates whether a corresponding storage block receives a write request during copying. For example, the indicator 132 indicates whether a storage block 112 in the source storage are 110 receives a write request during copying. In some embodiments, for example, the indicator with a value of 0 represents not receiving a write request during copying, while the indicator of a value 1 indicates receiving a write request during copying. It should be understood although 0 and 1 are used as example forms of the values of the indicator, other values or representations are also possible. As shown in FIG. 1, the indicator set 130 can be denoted as {000000 . . . }, which also can be referred to as write IO bitmap. In some embodiments, the indicator set 130 can only be stored in a cache instead of disks and can be deleted when the copy operation is completed. The use of indicator enables the source storage area to maintain the original data and the target storage area to maintain relatively new data.

In accordance with certain embodiments, the storage system stores host data on behalf of a set of external host computers (i.e., one or more hosts). Here, such write requests may be in response to host IO's from the set of external host computers.

According to the environment 100, data is being copied from the source storage area 110 to the target storage area 120. As indicated by arrow 140, the data in the storage block 113 is currently being copied, i.e., copying data in the storage block 113 to the storage block 123. At this time, a checkpoint 150 can be at the end of the storage block 130, which indicates progress of copying, i.e., the start position of the next copy operation. The checkpoint 150 will move forward along with the progress of the copying. Because storage blocks in the source storage area 110 have correspondence with storage blocks in the target storage area 120, indicators in the indicator set 130 also can be mapped to corresponding storage blocks in the target storage area 120 while indicating storage blocks in the source storage area 110.

In some embodiments, it also can store the copy metadata at the end of the storage area (e.g., disk chunk) for indicating whether data copying in each storage block is completed. For example, 1 can be used to indicate that the copy of a certain storage block has already been completed and 0 can be used to indicate that copy of the storage block is not completed. It should be appreciated that the copy metadata can be persistently stored as it is stored in the disk extent.

Write requests and read requests for the source storage area may be continually received during data copying from the source storage area to the target storage area. According to embodiments of the present disclosure, by setting an indicator indicating whether a storage block receives a write request during data copying, data to be written for the source storage area will be written into the target storage area directly without being written into the source storage area. Therefore, embodiments of the present disclosure can reduce data writing time during data copying and also can extend the lifetime of the source storage area.

Figure 2:
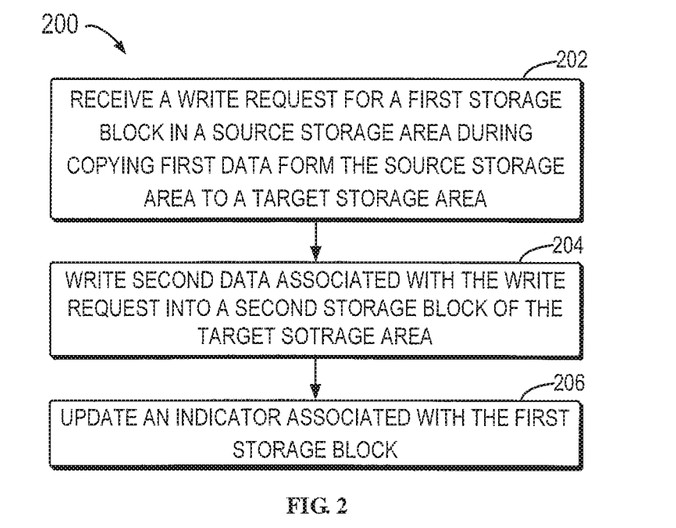
FIG. 2 illustrates a flowchart of a method for writing data during copying according to embodiments of the present disclosure.

FIG. 2 illustrates a flowchart of a method 200 for writing data during copying according to embodiments of the present disclosure. For example, the method 200 can be executed by a processor in the storage system. At 202, a write request for a first storage block in the source storage area is received when the first data is copied from the source storage area to the target storage area. For example, a write request for the storage block 112 is received during copying data from the source storage area 110 (source disk) to the target storage area 120 (target disk) in the RAID. Generally speaking, in the case that the source storage area (such as source disk) is to be replaced by the target storage area or the target storage area (such as target disk) is added in the RAID, it is usually required to perform data copying from the source storage area to the target storage area.

In some embodiments, data is copied using a mirror rebuilding manner, i.e., reading data from the source storage area and rebuilding data on the target storage area. Moreover, copy metadata and copy checkpoints can be correspondingly updated during copying and the copy operation is marked as completed after all the copying is finished. In some embodiments, a lock can be set for write operations so that it is impossible to perform two or more write operations on the same storage block.

At 204, second data associated with the write request is written into a second storage block of the target storage area, wherein the second storage block corresponds to the first storage block. For example, upon receiving a write request for a storage block 112 in the source storage area 110, the data to be written is written into a storage block 122 of the target storage area 120 directly without writing the data to be written into the storage block 112 again. It should be understood that the second storage block can be a destination storage block to which data in the first storage block is to be copied.

In some embodiments, the data to be written can be written based on the checkpoint 150 and position of the storage block directed by the write request. For example, the data to be written can be written into the target storage area directly dependent on the scope of the storage blocks involved with the data to be written, or data of the corresponding storage block can be read from the source storage area and the original data is updated by the data to be written, and then the updated data is written in the target storage area. Example implementations of writing data based on a checkpoint are described below with reference to FIGS. 3 and 4.

At 206, an indicator associated with the first storage block is updated, wherein the indicator indicates that the second data is written by a write request during copying. For example, while or after the second data is written into the second storage block 122, the indicator of the storage block 112 can be updated, e.g., changing the value of the indicator from 0 to 1 to indicate that the storage block 112 receives the write request during copying. In some embodiments, indicators of the indicator set 130 can be synchronized in the cache of a plurality of processors, and a status of the write request is then returned after completing synchronization of the indicators.

In some embodiments, the size of the basic unit of writing data can equal to the size of each storage block (i.e., basic unit for copying data). In such case, one storage block corresponds to one indicator. Alternatively, the size of the basic unit for writing data can be smaller than the size of each storage block, for example, being half (e.g., 512 KB) of the size of each storage block (e.g., 1 MB). In this case, one storage block can correspond to two indicators, for example, the first indicator indicates whether the first half of the storage block receives a write request during copying and the second indicator indicates whether a second half of the storage block receives a write request during copying.

It should be understood that although the method 200 can be described with reference to RAID, the method 200 can be applied into various data copying scenarios and should not be limited to RAID. Therefore, according to embodiments of the present disclosure, the data to be written for the source storage area will be written into the target storage area directly during the data copying between two storage areas and the indicator is used to indicate whether a certain storage block receives a write request during the copying, so as to enhance writing performance during data copying and extend the lifetime of the source storage area.

Figure 3:
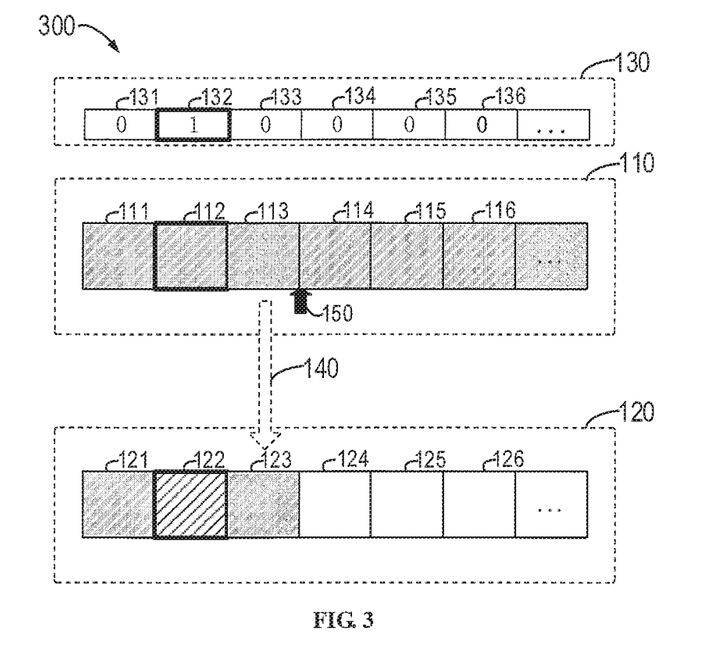
FIG. 3 illustrates a schematic diagram of an example environment for writing data prior to the checkpoint according to embodiments of the present disclosure.

FIG. 3 illustrates a schematic diagram of an example environment 300 for writing data prior to the checkpoint according to embodiments of the present disclosure. Compared with the environment 100 of FIG. 1, the environment 300 of FIG. 3 is receiving a write request for the storage block 112. Because the position of the storage block 112 is prior to the checkpoint 150, and the data blocks therein have already been copied to the storage block 122 in the target storage area 120, therefore the data to be written (data associated with write request) is written into the storage block 122 directly and the value of the corresponding indicator 132 is updated, such as updating the value of the indicator 132 from 0 to 1, according to embodiments of the present disclosure.

It should be understood that even if the data to be written only involves a part of the storage block 112 in the environment 300 of FIG. 3, it is still required to write the data to be written into the storage block 122 directly to replace a part of it because the storage block 122 has already included all original data. In some embodiments, if the write request involves a plurality of storage blocks prior to the checkpoint 150, it is required to update a plurality of indicators associated with the plurality of storage blocks and synchronize the updated indicators in a cache of a peer processor. In this way, it can avoid write operations for storage blocks in the source storage area.

Figure 4:
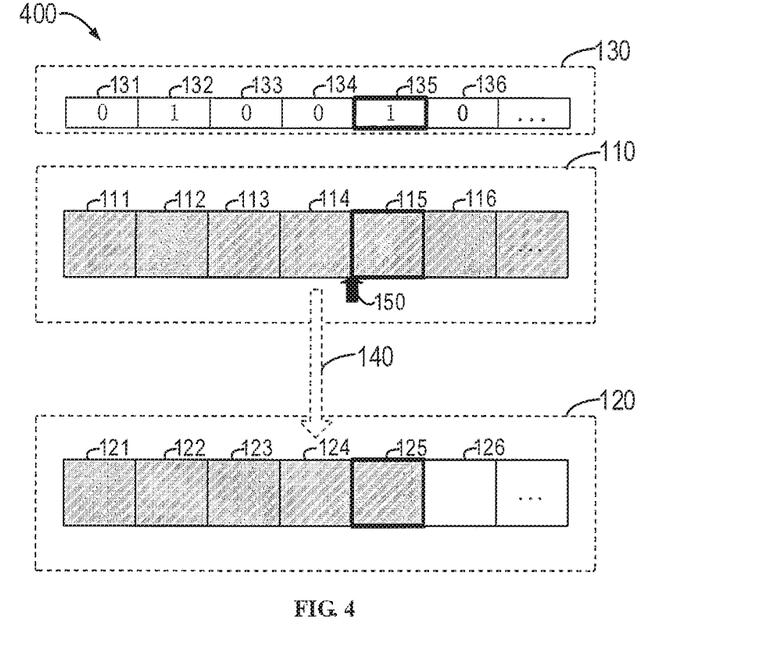
FIG. 4 illustrates a schematic diagram of an example environment for writing data after the checkpoint according to embodiments of the present disclosure.

FIG. 4 illustrates a schematic diagram of an example environment 400 for writing data after the checkpoint according to embodiments of the present disclosure. Compared with the environment 300 described in FIG. 3, the storage blocks involved with the write request received in the environment 400 of FIG. 4 are after a checkpoint. As shown in FIG. 4, position of the checkpoint 150 moves from after the storage block 113 to after the storage block 114 as the copy progresses, which demonstrates that the copying of the data blocks in the storage block 113 has been completed and the data in the storage block 114 is currently being copied to the storage block 124.

Continue to refer to FIG. 4. For example, a write request for the storage block 115 is received in the environment 400 at a certain moment; because the position of the storage block 115 is after the checkpoint 150, the data in the storage block 115 is not copied to the storage block 125. At this time, it is required to write the data based on the scope involved with the data to be written because granularity of data copying in the storage system is a single data block.

In some embodiments, when the data to be written relates to the entirety of the storage block 115, the data to be written can be written into the storage block 125 directly. In some embodiments, when the data to be written only involves a part of the storage block 115 (i.e., data associated with the write request failing to match with the size of an individual storage block), the storage block 115 is read from the source storage area 110, data at a corresponding position of the storage block 115 is updated using the data to be written to generate the updated data, and then the updated data is written in the storage block 125. In other words, there is no data in the storage block 125 as the checkpoint is prior to the storage block 115. If only the data to be written is written into the storage block 125, it just occupies a part of the storage block 125 rather than the entire storage block 125. However, data copying takes storage block as granularity, so the data previously written into the storage block 125 will be covered when the data in the storage block 115 is copied to the storage block 125 during the subsequent copying. Therefore, when the data to be written only involves a part of the storage block 115, it is required to read data in the storage block from the source storage area.

According to embodiments of the present disclosure, data in the storage block 115 is updated using data to be written and then the updated data will be written into the storage block 125, which simultaneously implements copying for the storage block 115 and data writing for the storage block 115. Moreover, after completing copying, updating and write operations, the copy metadata of the storage block 115 can be marked as copied and the indicator 135 is updated as already received the write request.

Figure 5:
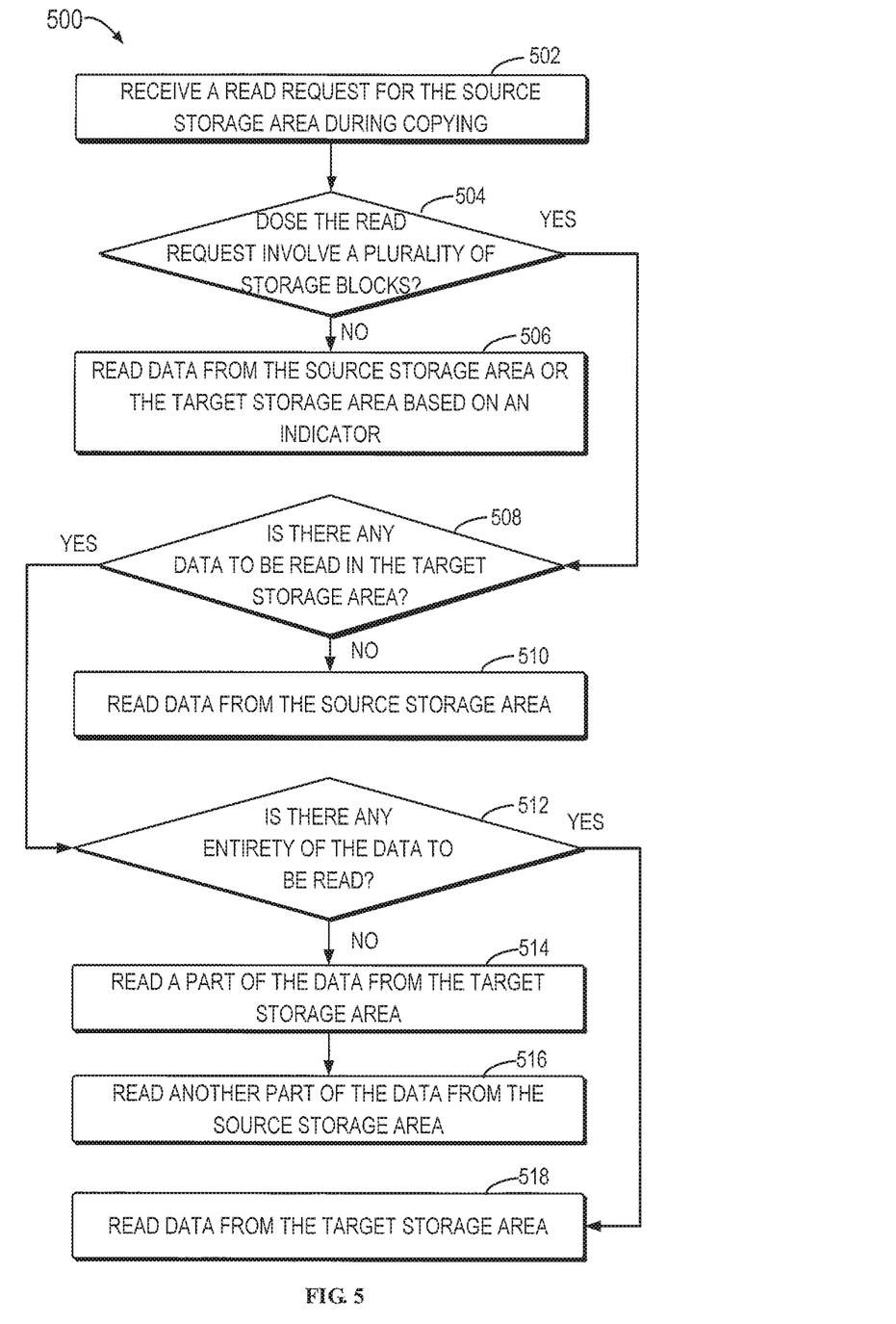
FIG. 5 illustrates a flowchart of a method for reading data during copying according to embodiments of the present disclosure.

FIG. 5 illustrates a flowchart of a method 500 for reading data during copying according to embodiments of the present disclosure. For example, the method 500 can be executed by a processor in the storage system. It should be understood that the method 500 can be executed before or after the method described with reference to FIG. 2, and also can be executed simultaneously with the method 200. Because the indicator is used to indicate whether each storage block receives the write request during copying, the operations of the read request for the source storage area also change correspondingly. It should be understood that the method 500 is a method for reading data during copying. However, before the copying begins, data can be read from the source storage area directly; after the copying is completed, data can be read from the target storage area directly.

At 502, a read request for the source storage area is received during copying. At 504, it is determined (or ascertained) whether the read request involves a plurality of storage blocks (i.e., whether across boundaries of individual storage blocks). At 506, if the read request does not involve a plurality of storage blocks, i.e., only involves a single storage block or part of it, it is determined whether the target storage area has data to be read (i.e., data associated with the read request) based on the indicator. In some embodiments, if the target storage area has data to be read, the data can be read from the target storage area; otherwise, data can be read from the source storage area. For example, with reference to the environment 300 described in FIG. 3, if a read request for the storage block 112 is received, data should be read from a corresponding storage block 122 in the target storage block 120 because the indicator indicates that the target storage area 120 includes newly written data while the source storage area 110 only has original data.

If the read request involves a plurality of storage blocks, it is determined whether the target storage area has data to be read at 508. If the target storage area does not have data to be read, data is read from the source storage area at 510. If the target storage area has data to be read, it is determined whether the target storage area has the entirety or a part of the data to be read at 512. Along these lines, only part of the data to be read may be available at the target storage area.

If the target storage area only has a part of the data to be read, a part of data is read from the target storage area at 514, and other data is read from the source storage area at 516. For example, with reference to the example described in FIG. 4, if a request for both storage block 115 and storage block 116 is received, it is determined, based on the checkpoint, the copy metadata and the indicator, that the target storage area only has a part of the data to be read. That is, the target storage area only has corresponding data in the storage block 115 without the corresponding data in the storage block 116. Therefore, according to embodiments of the present disclosure, data in the storage block 125 can be read from the target storage area 120 and data in the storage block 116 can be read from the source storage area 110. If the target storage area has the entirety of the data to be read, data can be read from the target storage area directly at 518.

According to embodiments of the present disclosure, if the indicator for each individual storage block indicates presence of a write request during copying, data is read from the target storage area directly. If the indicator for an individual storage block indicates absence of a write request during copying, determining the storage block is prior to or after the checkpoint; if the storage block is prior to the checkpoint, data is read from the source storage area; if the storage block is after the checkpoint, data is read from the target storage area. Therefore, in the embodiments of the present disclosure, when a read request is received during copying, different reading manners can be used based on the number of storage blocks involved with the read request, position of the involved storage blocks and the checkpoint. Thus, even if only the data during copying is written into the target storage area, data can be still guaranteed to be effective read, which improves IO performance of the storage system.

Figure 6:
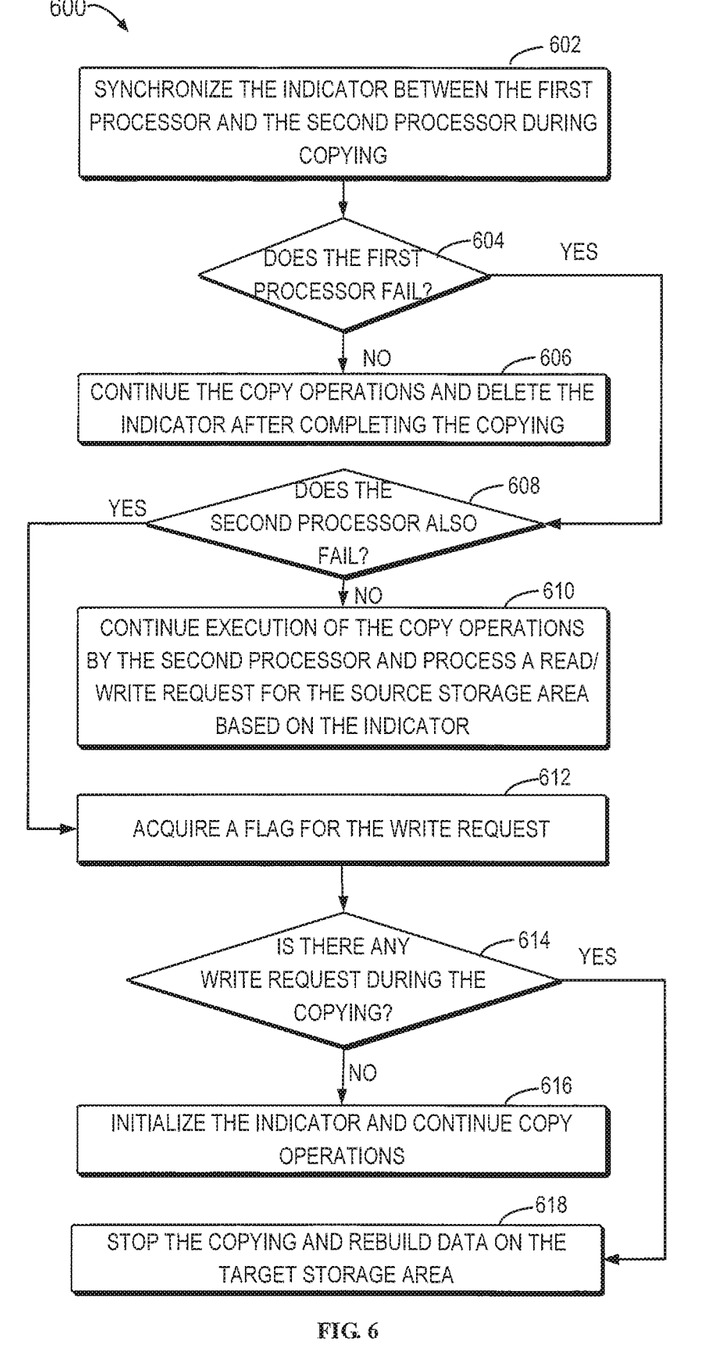
FIG. 6 illustrates a flowchart of a method for handling failures during copying according to embodiments of the present disclosure.

FIG. 6 illustrates a flowchart of a method 600 for handling failures during copying according to embodiments of the present disclosure. For example, the method 600 can be executed by a processor in the storage system. The method 600 can be executed before or after the method 200 described with reference to FIG. 2, or executed simultaneously with the method 200. In a dual active storage system, it usually has two processors, both of which constitute an active-active mode, i.e., both processors can perform control operations.

At 602, a first processor (also known as "main memory") performs the copy operations and indicators are synchronized between the first processor and a second processor (also known as "auxiliary memory") during copying, such that indicators can be synchronized in real time between the two processors. In some embodiments, the indicator is only stored in the cache of the processor rather than in a persistent storage apparatus (such as disk). At 604, it is determined whether the first processor fails during copying. If the first processor does not fail during copying, the first processor continues to perform the copy operations at 606, and deletes the indicator after completing the copying.

If the first processor fails during copying, it is further determined whether the second processor also fails during copying at 608. If the second processor does not fail, it takes overs control operations of the first processor at 610. For example, the second processor can continue to perform the copy operations starting from the checkpoint and the second processor can process the read request for the source storage area based on the copy metadata and the indicator. If the second processor also fails during copying, a flag for the write request is obtained after rebooting the two processors at 612, wherein the flag indicates whether a write request exists during copying. As the flag is stored in the disk, the status of the flag will not be missing when both the first processor and the second processor fail.

Next, it is determined, based on the flag, whether a write request exists during copying at 614. If the flag indicates absence of the write request during copying, it means that the data to be copied is never modified during copying. At 616, the indicator can be initialized and the execution of the copy operations is continued starting from the checkpoint. For example, the execution of the copy operations can be continued after rebooting the first processor or the second processor and recovering to normal working. If the flag indicates the presence of the write request during copying, it means the data to be copied is modified during copying. However, as the indicator is missing, it is impossible to determine the data in which storage block or storage blocks is modified. Therefore, the execution of the copy operations can be stopped at 618, and data is rebuilt on the target storage area, so as to ensure accuracy and reliability of data through recovery mechanism such as RAID.

In addition, embodiments of the present disclosure also provide a solution for handling fails of the storage area (e.g., disk) during copying. In some embodiments, if the source storage area (e.g., source storage area 110) fails (such as being removed, damaged and the like) during copying, it is required to rebuild, based on the copy metadata, the data that has not been copied on the target storage area. However, for the rest part of data, the target storage area has already had such data through copy operations, so this part of data does not need to be rebuilt, which improves rebuilding speed. In some embodiments, if the target storage area (e.g., target storage area 120) fails during copying, it is required to rebuild the writing data determined by the indicator on the source storage area because the source storage area does not have the writing data during copying. In this way, when the processor or the storage area (e.g., disk) fails, the failures can be effectively handled, so as to ensure integrity and accuracy of data. In some embodiments, if both the source storage area and the target storage area fail, a third storage area can be used and data is rebuilt on the third storage area.

Figure 7:
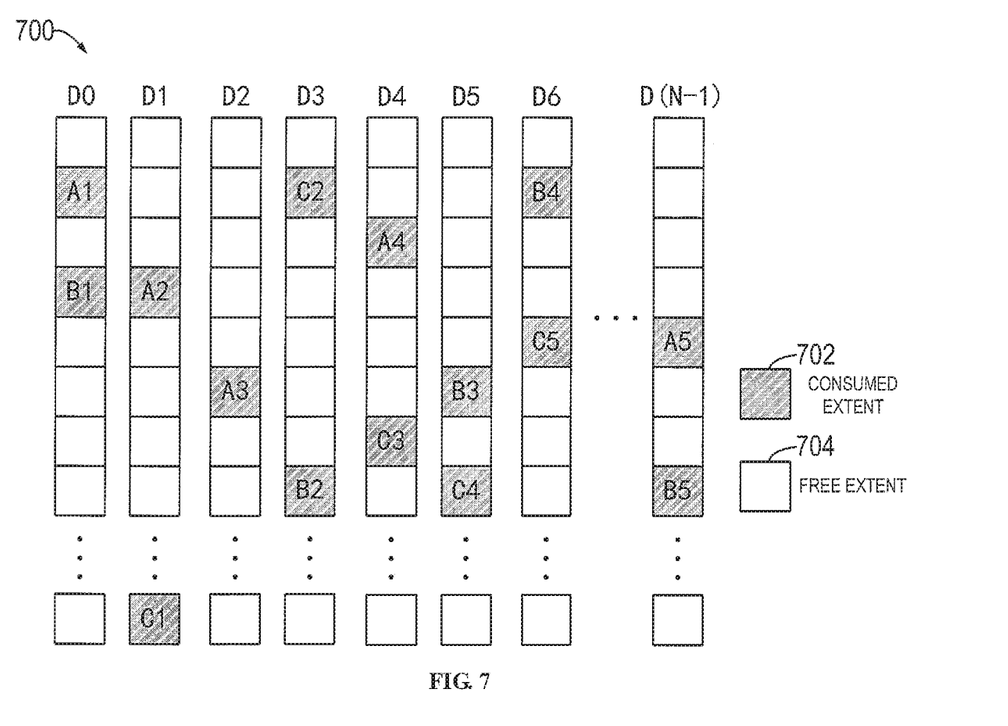
FIG. 7 illustrates a schematic diagram of example architecture of a mapped RAID according to embodiments of the present disclosure.
Figure 8:
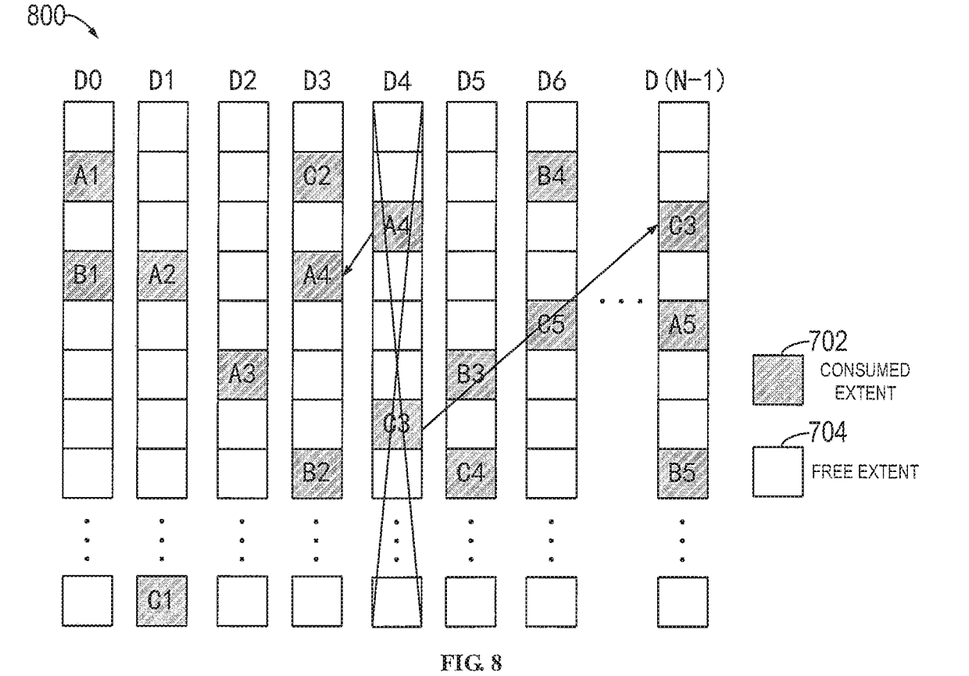
FIG. 8 illustrates a schematic diagram of rebuilding failed disks in a mapped RAID according to embodiments of the present disclosure.

In some embodiments, the method of the embodiments of the present disclosure can be applied into the mapped RAID. The term "mapped RAID" means that the RAID of the failure disk can be parallel rebuilt using a plurality of disks in the RAID. For example, when a target storage area is used to replace the source storage area or a target storage area is added in the mapped RAID, data copying can be initiated from the source storage area to the target storage area. FIGS. 7 and 8 illustrate schematic diagrams of example architecture 700 and 800 of the mapped RAID according to embodiments of the present disclosure.

With reference to FIG. 7, it schematically illustrates an example of using "4D+1P" RAID 5 on N disks, wherein N is greater than 5. The mapped RAID can be comprised (or formed) of more disks than the traditional RAID and each disk can be regarded as a set of continuous, non-overlapping and fix-sized extents. As shown in FIG. 7, the mapped RAID includes N disks, respectively denoted as disk D0, D1, D2, D3, . . . , D(N−1), and each disk is divided into a plurality of extents of the same size. In the mapped RAID shown by FIG. 7, extent A1, A2, A3, A4 and A5 constitute one RAID stripe (also known as RAID area) for storing data, wherein A1-A4 can be data storage blocks while A5 can be a parity check information block. Besides, extents B1, B2, B3, B4 and B5 constitute another RAID stripe, and extents C1, C2, C3, C4 and C5 constitute another RAID stripe.

As shown in FIG. 7, if it is required to create an RAID stripe, five extents can be randomly selected from 5 different disks. Therefore, data and check information will finally be distributed into consumed extents (shown as 702 in FIG. 7) of all disks. Additionally, some extents also can be reserved on each disk as hot free extents (shown as 704 in FIG. 7), which is unlike the traditional RAID 5 that reserves the entire disk as the hot free disk. When one disk fails, one extent on other disks can be randomly selected as replacement for each extent on the failing disk.

As shown in FIG. 8, when the disk D4 fails, one hot free extent (shown as 704 in FIG. 8) on other disks can be randomly selected as replacement for each consumed extent (shown as 702 in FIG. 8, such as extents A4 and C3) on the disk D4. For example, the extent A4 is rebuilt and written into one free extent in the disk D3 while the extent C3 is rebuilt and written into one free extent in the disk D(N−1). The limitation for extent selection is a requirement of constantly ensuring that each RAID stripe is across five different disks. Therefore, it is possible that many, or even all, of the disks in RAID can be applied into rebuilding of the failing disks using the mapped RAID technology. Moreover, because the individual hot free disk is absent and rebuilding and writing of a plurality of extents can be performed in parallel, the speed of rebuilding RAID will be greatly increased.

The inventor of the present application discovered that the mapped RAID has greater copying demands than the traditional non-mapped RAID. For example, if a certain disk in the mapped RAID is going to be dead (marked with End of Life—EOL), it is required to move data to a normal disk before the disk is dead, which is known as active (PACO) copying scenario. For another example, data distribution in the mapped RAID is uneven, so a new disk would be added in the mapped RAID to balance the load, which is known as shuffle copying scenario.

In the mapped RAID, data copying is usually implemented using a mirror rebuilding algorithm. The source storage area and the target storage area constitute a mirror pair, which moves data from the source storage area to the target storage area using a mirror library. In some embodiments, each stripe can be represented with a mapping table in the mapped RAID. Optionally, a column indicating copying target can be added in the mapping table. If the column is void, it means no copy operations. If the column contains information of the storage area (e.g., extent) of the copying target, it demonstrates a need of performing data copy operations. It should be noted that the mapped RAID has a plurality of stripes and each stripe can have its own copy operations. In general, copy operations of different stripes will not be performed simultaneously; on the contrary, copy operations of the other stripe will begin only when the copy operations of the stripe are completed.

As the mapped RAID has greater demands for data copying, the method of embodiments of the present disclosure is particularly suitable for scenarios of disk replacement and disk addition in the mapped RAID, thereby enhancing IO performance of the mapped RAID. For example, in the active copying scenario of disk replacement, the source storage area is marked as terminated; the method of the embodiments of the present disclosure can extend the lifetime of the source storage area by reducing writing into the source storage area. For another example, in the shuffle copying scenario of disk addition, embodiments of the present disclosure also can reduce writing into the source storage area and wear of the source storage area. Besides, since the embodiments of the present disclosure only need to write into the target storage area without writing into the source storage area, it also can reduce the execution time of data writing.

Figure 9:
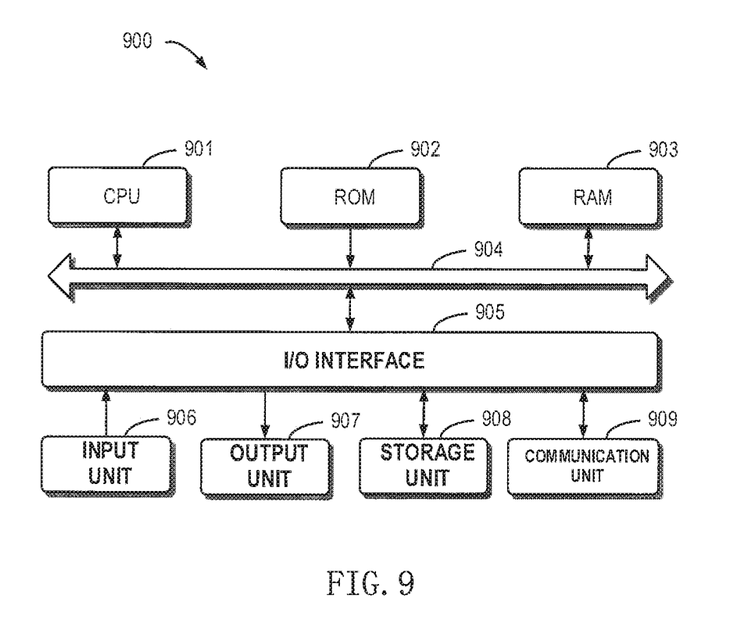
FIG. 9 illustrates a schematic block diagram of a device for implementing embodiments of the present disclosure.

FIG. 9 illustrates a schematic block diagram of an example device 900 for implementing embodiments of the present disclosure. As shown, the device 900 includes a central process unit (CPU) 901, which can perform various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. An input/output (I/O) interface 905 is also connected to the bus 904.

A plurality of components in the device 900 is connected to the I/O interface 905, including: an input unit 906, e.g., keyboard, mouse etc.; an output unit 907, e.g., various kinds of display and loudspeakers etc.; a storage unit 908, e.g., disk and optical disk etc.; and a communication unit 909, e.g., network card, modem, wireless transceiver etc. The communication unit 909 allows the device 900 to exchange information/data with other devices via the computer network, such as Internet, and/or various telecommunication networks.

The various methods or procedure described above can be executed by the processing unit 901. For example, in some embodiments, the method can be implemented as a computer software program tangibly included in the machine-readable medium, e.g., the storage unit 908. In some embodiments, the computer program can be partially or fully loaded and/or mounted to the device 900 via the ROM 902 and/or the communication unit 909. When the computer program is loaded to the RAM 903 and executed by the CPU 901, one or more steps or actions of the above described methods 200, 500 and 600 can be implemented.

In some embodiments, the above described method 200, 500 and 600 can be implemented as a computer program product. The computer program product can include a computer-readable storage medium, on which computer-readable program instructions for executing various aspects of the present disclosure are loaded.

The computer-readable storage medium can be a tangible apparatus that maintains and stores instructions using by instruction executing apparatuses. The computer-readable storage medium can be, but not limited to, such as an electrical storage device, a magnetic storage device, an optical storage device, an electromagnetic storage device, a semiconductor storage device or any appropriate combinations of the above. More concrete examples of the computer-readable storage medium (non-exhaustive list) include: a portable computer disk, hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, a floppy disk, a mechanical coding devices, such as a punched card stored with instructions thereon, or an arch structure in a slot, and any appropriate combinations of the above. The computer-readable storage medium used here is not interpreted as transient signals per se, such as radio waves or other freely propagated electromagnetic waves, electromagnetic waves propagated via waveguide or other transmission media (such as optical pulses via fiber-optic cables), or electric signals propagated via electric wires.

The described computer-readable program instructions herein can be downloaded from the computer-readable storage medium to various computing/processing devices, or to an external computer or an external storage device via Internet, local area network, wide area network and/or wireless network. The network can include copper-transmitted cables, optical fiber transmissions, wireless transmissions, routers, firewalls, switches, gateway computers and/or edge servers. A network adapter card or network interface in each computing/processing device receives computer-readable program instructions from the network and forwards the computer-readable program instructions to store in the computer-readable storage medium of various computing/processing devices.

The computer program instructions for performing operations of the present disclosure can be assembly instructions, instructions of instruction set architecture (ISA), machine instructions, machine-related instructions, microcode, firmware instructions, state setting data, or source codes or target codes written in any combinations of one or more programming languages, wherein the programming languages consist of object-oriented programming languages, and traditional procedural programming languages. The computer-readable program instructions can be implemented fully on the user computer, partially on the user computer, as an independent software package, partially on the user computer and partially on the remote computer, or completely on the remote computer or server. In the case of involving the remote computer, the remote computer can be connected to the user computer via any kind of networks, including local area network (LAN) or wide area network (WAN), to the external computer (e.g., connected via Internet by the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions can be provided to a processing unit of a general-purpose computer, a dedicated computer or other programmable data processing apparatuses to manufacture a machine, such that the instructions that, when executed by the processing unit of the computer or other programmable data processing apparatuses, generate an apparatus for implementing functions/actions specified in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions specified in one or more blocks of the flow chart and/or block diagram.

The computer-readable program instructions can also be loaded into a computer, other programmable data processing apparatuses or other devices, so as to perform a series of operation steps on the computer, other programmable data processing apparatuses or other devices to generate a computer-implemented procedure. Therefore, the instructions executed on the computer, other programmable data processing apparatuses or other devices implement functions/actions specified in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or instructions, wherein the module and the part of program segment or instructions include one or more executable instructions for performing specified logic functions. In some alternative implementations, the functions indicated in the block can also take place in an order different from the one indicated in the drawings. For example, two successive blocks can be in fact executed substantially in parallel or sometimes in a reverse order dependent on the involved functions. It should also be noted that each block in the block diagram and/or flow chart and combinations of the blocks in the block diagram and/or flow chart can be implemented by a hardware-based system exclusive for executing specified functions or actions, or by a combination of dedicated hardware and computer instructions.

Various embodiments of the present disclosure have been described above and the above description is by way of example only rather than exhaustive and is not limited to the various embodiments of the present disclosure. Many modifications and alterations, without deviating from the scope and spirit of the explained various embodiments, are obvious for those skilled in the art. The selection of terms herein aims to best explain principles and actual applications of various embodiments and technical improvements made in the technologies of the market, or enable other ordinary skilled in the art to understand various embodiments of the present disclosure.

We claim:

1. A method for writing data, comprising:
receiving a write request for a first storage block in a source storage area during copying first data from the source storage area to a target storage area;
writing second data associated with the write request into a second storage block of the target storage area, the second storage block corresponding to the first storage block; and
updating an indicator associated with the first storage block, the indicator indicating that the second data is written by the write request during the copying;
wherein the writing the second data comprises:
determining a checkpoint for the copying, the checkpoint indicating a progress of the copying in the source storage area; and
writing the second data based on the checkpoint and a first position of the first storage block in the source storage area.

2. The method of claim 1, wherein the writing the second data based on the checkpoint and a first position of the first storage block in the source storage area comprises:
in response to the first position being prior to the checkpoint, writing the second data into the second storage block directly.

3. The method of claim 1, wherein the writing the second data based on the checkpoint and a first position of the first storage block in the source storage area comprises:
in response to the first position being after the checkpoint, determining whether the second data involves entirety of the first storage block; and
in response to determining the second data involving entirety of the first storage block, writing the second data into the second storage block directly.

4. The method of claim 3, wherein the writing the second data based on the checkpoint and a first position of the first storage block in the source storage area further comprises:
in response to determining the second data involving a part of the first storage block,
reading the first storage block from the source storage area;
updating data at a corresponding position in the first storage block using the second data to generate updated second data; and
writing the updated second data into the second storage block.

5. The method of claim 1, further comprising:
in response to receiving a read request for a plurality of storage blocks in the source storage area during the copying, determining, based on a plurality of indicators associated with the plurality of storage blocks, whether the target storage area includes third data associated with the read request; and
in response to the target storage area including a part of the third data:
reading the part of the third data from the target storage area; and
reading other part of the third storage data from the source storage area.

6. The method of claim 1, wherein the copying is performed by a first processor, and the method further comprises:
synchronizing the indicator between the first processor and a second processor during the copying, the second processor and the first processor constituting a dual active processor; and
deleting the indicator after completing the copying.

7. The method of claim 6, further comprising:
in response to the first processor failing during the copying, processing, by the second processor, a read request for the source storage area based on the indicator.

8. The method of claim 6, further comprising:
in response to both the first processor and the second processor failing during the copying:
acquiring a flag for the write request; and
in response to the flag indicating presence of the write request during the copying, rebuilding data on the target storage area.

9. The method of claim 1, further comprising:
in response to the source storage area failing during the copying, rebuilding, on the target storage area, a part of the first data that has not been copied; and
in response to the target storage area failing during the copying, rebuilding at least the second data on the source storage area based on the indicator.

10. The method of claim 1, further comprising:
in response to replacing the source storage area with the target storage area or adding the target storage area in a mapped redundant array of independent disks (RAID), copying the first data from the source storage area to the target storage area, the mapped RAID being able to rebuild a failed disk using a plurality of disks.

11. A device for writing data, comprising:
a processing unit; and a memory coupled to the processing unit and storing instructions, the instructions, when executed by the processing unit, perform actions of:
  receiving a write request for a first storage block in a source storage area during copying first data from the source storage area to a target storage area,
  writing second data associated with the write request into a second storage block of the target storage area, the second storage block corresponding to the first storage block, and
  updating an indicator associated with the first storage block, the indicator indicating that the second data is written by the write request during the copying;
  wherein the writing the second data comprises:
    determining a checkpoint for the copying, the checkpoint indicating a progress of the copying in the source storage area; and
    writing the second data based on the checkpoint and a first position of the first storage block in the source storage area.

12. The device of claim 11, wherein the writing the second data based on the checkpoint and a first position of the first storage block in the source storage area comprises:
  in response to the first position being prior to the checkpoint, writing the second data into the second storage block directly.

13. The device of claim 11, wherein the writing the second data based on the checkpoint and a first position of the first storage block in the source storage area comprises:
  in response to the first position being after the checkpoint, determining whether the second data involves entirety of the first storage block; and
  in response to determining the second data involving entirety of the first storage block, writing the second data into the second storage block directly.

14. The device of claim 13, wherein the writing the second data based on the checkpoint and a first position of the first storage block in the source storage area further comprises:
  in response to determining the second data involving a part of the first storage block,
  reading the first storage block from the source storage area;
  updating data at a corresponding position in the first storage block using the second data to generate updated second data; and
  writing the updated second data into the second storage block.

15. The device of claim 11, wherein the actions further comprise:
  in response to receiving a read request for a plurality of storage blocks in the source storage area during the copying, determining, based on a plurality of indicators associated with the plurality of storage blocks, whether the target storage area includes third data associated with the read request; and
  in response to the target storage area including a part of the third data:
    reading the part of the third data from the target storage area; and
    reading other part of the third storage data from the source storage area.

16. The device of claim 11, wherein the copying is performed by a first processor, and the actions further comprise:
  synchronizing the indicator between the first processor and a second processor during the copying, the second processor and the first processor constituting a dual active processor; and
  deleting the indicator after completing the copying.

17. The device of claim 16, wherein the actions further comprise:
  in response to the first processor failing during the copying, processing, by the second processor, a read request for the source storage area based on the indicator.

18. The device of claim 16, wherein the actions further comprise:
  in response to both the first processor and the second processor breaking down during the copying:
    acquiring a flag for the write request; and
    in response to the flag indicating presence of the write request during the copying, rebuilding data on the target storage area.

19. The device of claim 11, wherein the actions further comprise:
  in response to the source storage area failing during the copying, rebuilding on the target storage area a part of the first data that has not been copied; and
  in response to the target storage area failing during the copying, rebuilding at least the second data on the source storage area based on the indicator.

20. The device of claim 11, wherein the actions further comprise:
  in response to replacing the source storage area with the target storage area or adding the target storage area in a mapped redundant array of independent disks (RAID), copying the first data from the source storage area to the target storage area, the mapped RAID being able to rebuild a failed disk using a plurality of disks.

21. A computer program product having a non-transitory computer readable medium which stores a set of instructions for writing data; the set of instructions, when carried out by computerized circuitry, causing the computerized circuitry to perform a method of:
  receiving a write request for a first storage block in a source storage area during copying first data from the source storage area to a target storage area;
  writing second data associated with the write request into a second storage block of the target storage area, the second storage block corresponding to the first storage block; and
  updating an indicator associated with the first storage block, the indicator indicating that the second data is written by the write request during the copying;
  wherein the writing the second data comprises:
    determining a checkpoint for the copying, the checkpoint indicating a progress of the copying in the source storage area; and
    writing the second data based on the checkpoint and a first position of the first storage block in the source storage area.

22. A method for writing data, comprising:
  receiving a write request for a first storage block in a source storage area during copying first data from the source storage area to a target storage area;
  writing second data associated with the write request into a second storage block of the target storage area, the second storage block corresponding to the first storage block;
  updating an indicator associated with the first storage block, the indicator indicating that the second data is written by the write request during the copying;

in response to receiving a read request for a plurality of storage blocks in the source storage area during the copying, determining, based on a plurality of indicators associated with the plurality of storage blocks, whether the target storage area includes third data associated with the read request; and in response to the target storage area including a part of the third data:

reading the part of the third data from the target storage area; and reading other part of the third storage data from the source storage area.

23. A device for writing data, comprising:

a processing unit; and a memory coupled to the processing unit and storing instructions, the instructions, when executed by the processing unit, perform actions of:

receiving a write request for a first storage block in a source storage area during copying first data from the source storage area to a target storage area, writing second data associated with the write request into a second storage block of the target storage area, the second storage block corresponding to the first storage block, updating an indicator associated with the first storage block, the indicator indicating that the second data is written by the write request during the copying, in response to receiving a read request for a plurality of storage blocks in the source storage area during the copying, determining, based on a plurality of indicators associated with the plurality of storage blocks, whether the target storage area includes third data associated with the read request, and in response to the target storage area including a part of the third data:

reading the part of the third data from the target storage area, and reading other part of the third storage data from the source storage area.

* * * * *